(12) United States Patent
Berland et al.

(10) Patent No.: US 8,431,023 B2
(45) Date of Patent: Apr. 30, 2013

(54) FUEL FILTER AND FILTER CARTRIDGE ALLOWING THE ELECTROSTATIC CHARGES TO BE DRAINED OFF

(75) Inventors: Yann Berland, Guyancourt (FR);
Laurent Fremont, Evreux (FR);
Emmanuel Girault, Guyancourt (FR);
Mathieu Petiteaux, Le Celle Saint Cloud (FR); Laurent Fayolle, Elancourt (FR)

(73) Assignee: Filtrauto, Guyancourt (FR)

( * ) Notice: Subject to any disclaimer, the term of this patent is extended or adjusted under 35 U.S.C. 154(b) by 813 days.

(21) Appl. No.: 12/511,745

(22) Filed: Jul. 29, 2009

(65) Prior Publication Data

US 2010/0025318 A1 Feb. 4, 2010

(30) Foreign Application Priority Data

Jul. 31, 2008 (FR) ...................................... 08 55312

(51) Int. Cl.
*B01D 35/06* (2006.01)
*B01D 35/14* (2006.01)
*B01D 35/26* (2006.01)
*F02M 37/04* (2006.01)
*F02M 37/22* (2006.01)

(52) U.S. Cl.
USPC ....................... 210/243; 210/172.3; 210/416.4

(58) Field of Classification Search .................. 210/243, 210/416.4, 172.3
See application file for complete search history.

(56) References Cited

U.S. PATENT DOCUMENTS

| 4,999,108 | A | | 3/1991 | Koch et al. |
|---|---|---|---|---|
| 5,380,432 | A | | 1/1995 | Brandt |
| 5,642,718 | A | * | 7/1997 | Nakai et al. .................... 123/497 |
| 5,785,032 | A | | 7/1998 | Yamashita et al. |
| 6,142,126 | A | * | 11/2000 | Kanamaru ...................... 123/509 |
| 6,168,713 | B1 | | 1/2001 | Sekine et al. |
| 6,260,540 | B1 | | 7/2001 | Hiraiwa et al. |
| 6,613,227 | B2 | * | 9/2003 | Rickle ............................ 210/243 |
| 6,740,236 | B2 | * | 5/2004 | Rickle et al. ................... 210/243 |
| 2003/0057146 | A1 | | 3/2003 | Rickle et al. |
| 2003/0132156 | A1 | * | 7/2003 | Rickle .......................... 210/416.4 |
| 2004/0173187 | A1 | | 9/2004 | Kanamaru et al. |

FOREIGN PATENT DOCUMENTS

| EP | 1452725 | 2/2007 |
|---|---|---|
| WO | 2004/009215 | 1/2004 |

OTHER PUBLICATIONS

Preliminary Search Report from French Application Serial No. 0855312, Mar. 10, 2009.

* cited by examiner

*Primary Examiner* — Thomas M Lithgow
(74) *Attorney, Agent, or Firm* — McDonnell Boehnen Hulbert & Berghoff LLP

(57) ABSTRACT

A fuel filter comprises a bowl and a cover that form an enclosure, in which a filter element and a electrical device are concentrically arranged, a connector making it possible to connect the device to an external supply is carried by the bowl or by the cover. The electrical device is arranged in a dissipative shell and connected to the earth of the electrical device or of the connector. At least one part of the filter element is dissipative and at least one dissipative flexible contact is arranged between said dissipative part and the shell in order to provide a dissipative continuity between the filter element and the shell.

14 Claims, 4 Drawing Sheets

FUEL FILTER AND FILTER CARTRIDGE ALLOWING THE ELECTROSTATIC CHARGES TO BE DRAINED OFF

FIELD OF THE INVENTION

The technical field of the present invention is that of fuel filters and more particularly, fuel filters in which at least one electrical device is integrated.

BACKGROUND OF THE INVENTION

During the circulation of a fluid, and more particularly when a fuel flows in a filter, the friction of the fluid whilst it passes through the filter medium generates losses of electrons which accumulate at the level of the filter element and the filter bowl, causing a significant concentration of electrostatic charges. It is thus essential to provide a dissipative path allowing these charges to be dissipated in order to avoid electric arcs being created between the filter and the structure of the vehicle (earth) which could result in a perforation of the filter housing and thus fuel leakages.

A first solution, disclosed by U.S. Pat. No. 6,168,713 consists of producing the filter body from conductive or dissipative material (for example metal or plastic loaded with conductive fibres or particles) and connecting the filter body to the vehicle earth. This solution nevertheless presents a drawback when the filter body comprises an electrical connector, for example for supplying a fuel pump or other electrical device such a valve, a heater or a sensor. In fact, as the filter body is conductive, there is a risk of creating a short-circuit between the connector terminals and affecting the efficiency of the electrical device. Moreover, the use of plastics or loaded polymers is particularly costly.

Another solution, disclosed by U.S. Pat. No. 6,740,236, consists of arranging a circular spring on a conductive flange and integrating with the filter housing a conductive element on which the circular spring rests. The conductive element is connected to the vehicle earth. This solution however requires the use of a specific terminal, dedicated to the dissipation of the electrostatic charges, and requires the integration of an additional wire in the vehicle's electrical circuit.

SUMMARY OF THE PRESENT INVENTION

The subject of the invention is therefore a fuel filter and a filter element having a simple and inexpensive design allowing electrostatic charges to be dissipated.

The invention relates to a fuel filter, comprising a bowl and a cover forming an enclosure in which a filter element and an electrical device are concentrically arranged, a connector allowing the device to be electrically connected to an external supply is carried by the bowl or by the cover, the electrical device is arranged in a dissipative shell, the shell is electrically connected to the earth of the electrical device or of the connector, at least one part of the filter element is dissipative and at least one dissipative flexible contact is arranged between said dissipative part and the shell in order to provide dissipative continuity between the filter element and the shell.

According to a feature of the invention, the electrical device is a fuel pump and the filter element is arranged upstream of the fuel flow with respect to the pump.

According to another feature of the invention, at least one dissipative flexible contact is integral with the filter element.

The invention also relates to a filter element for a fuel filter, the filter element comprising a first flange, called the upper, a second flange, called the lower, a holder having a substantially tubular shape and a filter medium arranged around the holder and through which the fuel to be filtered can pass, the filter medium being interposed between the first and the second flanges, at least one part of the filter element is dissipative and comprises at least one dissipative flexible contact intended to provide a dissipative contact with the shell.

According to a feature of the invention, the upper flange is conductive and at least one dissipative flexible contact is integral with the upper flange.

According to another feature of the invention, the lower flange is conductive and at least one dissipative flexible contact is integral with the lower flange.

According to yet another feature of the invention, the tubular holder is conductive and in that at least one dissipative flexible contact is integral with the tubular holder.

According to another feature of the invention, at least one dissipative flexible contact is present in the form of a lug or skirt formed from a single piece with the part with which it is integral.

According to another feature of the invention, at least one dissipative flexible contact is oriented towards the inside of the tubular holder.

According to another feature of the invention, at least one dissipative flexible contact is presented in the form of a spiral or leaf spring fixed onto the dissipative part.

An advantage of the present invention resides in the fact that it allows the electrostatic charges to be dissipated and avoids the formation of electric arcs between the filter and the structure of the vehicle.

A further advantage resides in the use of an easily-deformable dissipative flexible contact which makes it possible to take up radial and axial play.

A yet further advantage resides in the fact that the invention makes it possible to produce a simply-designed fuel filter at a reduced cost.

A yet further advantage also resides in ease of installation and removal of the filter element without the need for any particular electrical expertise.

A yet further advantage for certain embodiments of the filter element resides in the fact that the latter does not require the addition of any specific part in relation to a conventional filter.

A further advantage resides in the recyclability of the filter element.

A further advantage resides in the fact that the invention uses the connector of the fuel pump and does not require the integration of a connector specifically for electrostatic discharge.

BRIEF DESCRIPTION OF THE DRAWINGS

Other characteristics and advantages of the invention will become apparent during the following description of several embodiments, given by way of non-limitative examples, with reference to the attached drawings, in which.

DETAILED DESCRIPTION OF THE INVENTION

The technical effect sought by the invention is the dissipation of electrostatic charges. To this end, it is important to specify the terminology used to classify the properties of the materials. Conductive, dissipative, astatic and insulating materials are differentiated. By "insulating" is meant a material which does not conduct current and does not allow the dissipation of electrostatic charges. Such materials have a surface resistivity greater than $10^{12}$ Ohms. The "astatic" materials have a surface resistivity comprised between $10^9$ and $10^{12}$ Ohms, the "dissipative" materials have a surface resistivity comprised between $10^5$ and $10^9$ Ohms and the "conductive" materials have a surface resistivity less than $10^5$ Ohms. In the present description, the term "dissipative" will be applied both to the conductive and to the dissipative materials and will denote a property allowing electrostatic discharge.

Figure 1:
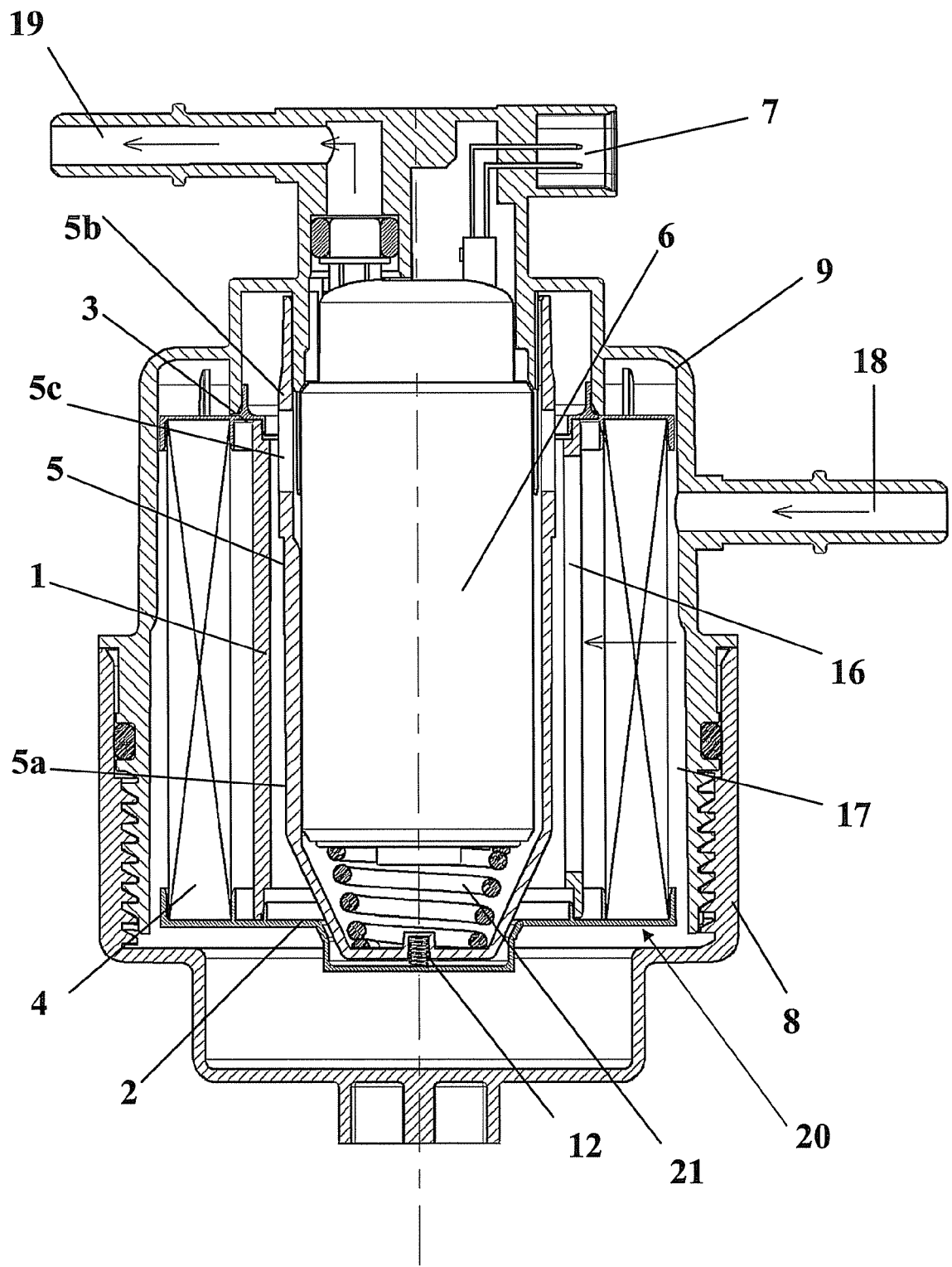
FIG. 1 is a cross section view of a fuel filter according to the invention according to a first embodiment.

FIG. 1 is a cross section view showing a fuel filter according to the invention. The filter comprises a bowl 8 and a cover 9 fixed onto the bowl (in this case by a threaded joint) in order to form an enclosure 17 in which a filter element 20 and an electrical device 6 (constituted in this example by a fuel pump 6) are concentrically arranged.

The cover 9 comprises in standard fashion a non-filtered fuel inlet 18, a filtered fuel outlet 19 and a connector 7 allowing the pump 6 to be electrically connected to an external supply.

The pump 6 is arranged in a shell 5 which on the one hand holds the pump 6 and on the other hand makes it possible to maintain a fuel reserve in which the pump is immersed. To this end the lower part 5a of the shell forms a fuel-tight container while the upper part 5b comprises openings 5c through which the fuel is allowed to flow.

The filter element 20 comprises a first flange 3, called upper, a second flange 2, called lower, a holder 1 having a substantially tubular shape and a filter medium 4 arranged around the holder 1 and through which the fuel to be filtered is allowed to pass. The filter medium is interposed between the first and the second flange and the holder 1 is pierced with holes 16 in order to allow the fuel to pass. The flanges 2 and 3 have a substantially circular shape and the filter medium 4 is made in the shape of a cylinder which can be obtained in a known manner by winding or folding a medium (for example straight, chevron or curved).

The bowl 8 and the cover 9 are made from electrically insulating plastic or polymer material. The shell 5 is dissipative and electrically connected to the pump 6. At least one part of the filter element 20 is dissipative (for example a flange or the tubular holder). In this figure, the dissipative connection between the shell 5 and the pump 6 is made by a helical spring 21 arranged in the shell 5. In the case where the body of the pump 6 is not connected to earth, or is not conductive, it is also possible to connect the shell to the pump by an electrical wire (not shown).

A dissipative flexible contact is arranged between a dissipative part of the filter element 20 and the shell 5 in order to provide a dissipative continuity between the filter element 20 and the shell 5. In this figure, the dissipative flexible contact is shown in the form of a helical spring 12 arranged between the lower flange 2 and the lower part 5a of the shell and oriented towards the inside of the tubular holder 1. The spring 12 is integral with the lower flange 2. Other embodiments of the dissipative flexible contact will be described in more detail below, with reference to FIGS. 2 to 6.

The fuel pump 6 is arranged downstream (with respect to the fuel flow) of the filter element 20 and the filter operates under reduced pressure.

The fuel flow in the filter, shown by arrows in the figure, is as follows: the pump 6 creates a reduced pressure in the filter and sucks in the fuel which enters the enclosure 17 via the inlet 18, flows around the filter element 20, passes radially through the medium 4 to the inside of the filter element, passes through the tubular holder 1 and rises again to the openings 5c in order to enter the shell 5 where it is sucked in by the pump 6 in order to exit again under pressure via the outlet 19.

In the embodiment shown in FIG. 1, the flow of electrostatic charges in the filter is as follows: the fuel flow in the medium 4 causes a loss of electrons, the electrons migrate towards the lower flange 2 (this flow can be improved by using a conductive adhesive between the medium and the flange), pass through the spring 12 of the flange, up to the shell 5, flow either by direct contact, or through the helical spring 21, to the body of the pump 6 and return to the connector 7 where they are drained off by an earth wire.

FIGS. 2 to 6 show different embodiments of the dissipative flexible contact arranged between the dissipative part of the filter element and the shell 5 in order to provide a dissipative continuity between the filter element 20 and the shell 5.

Figure 2:
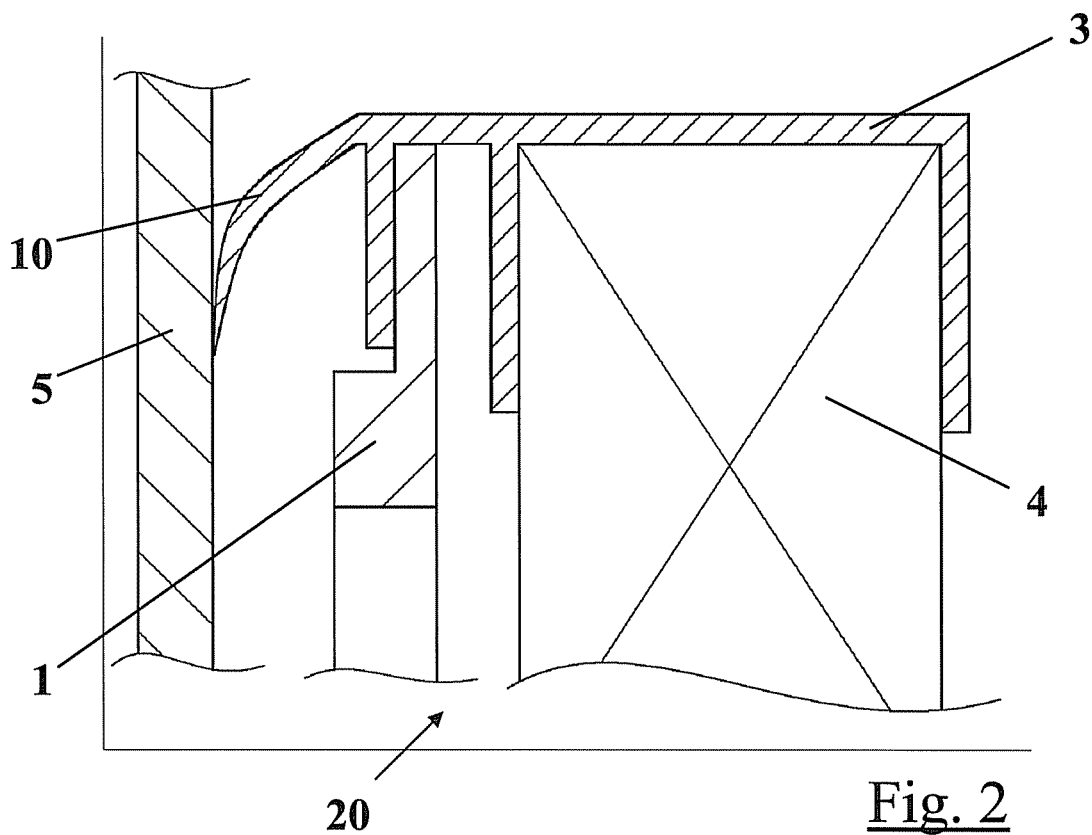
FIGS. 2 and 3 show a variant embodiment of the dissipative flexible contact.
Figure 3:
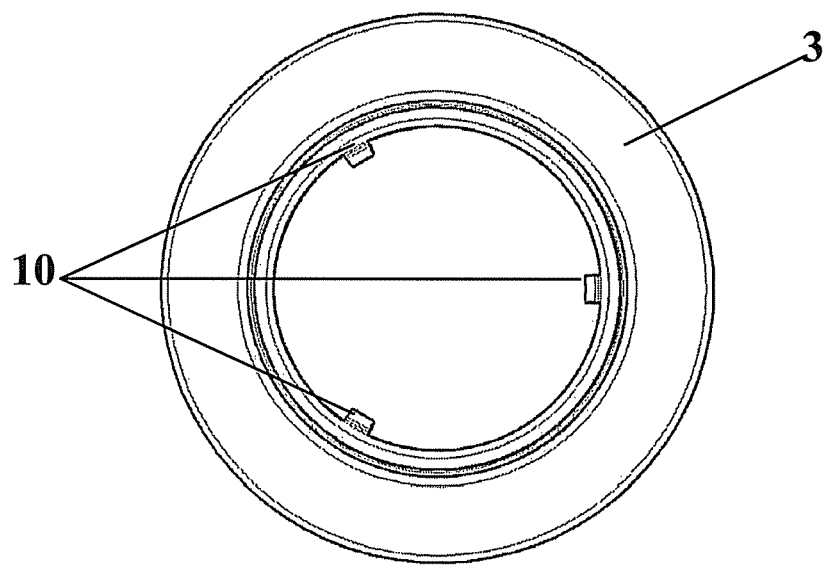

FIGS. 2 and 3 are respectively a cross section of the filter element 20 and a bottom view of the upper flange 3, showing another embodiment of a dissipative flexible contact 10, integral with the upper flange 3 of the filter element 20.

In this embodiment, the upper flange 3 of the filter element is made from a dissipative material and comprises flexible lugs 10 also made from dissipative material and in contact with the shell 5 in order to provide a dissipative continuity between the filter element 20 and the shell 5. The flexible contacts 10 and the upper flange 3 form a single piece, for example made by moulding a polymer loaded with dissipative material. In this embodiment, there are three flexible contacts 10, arranged at 120° on the internal diameter of the flange 3 and oriented toward the inside of the tubular holder 1.

Figure 4:
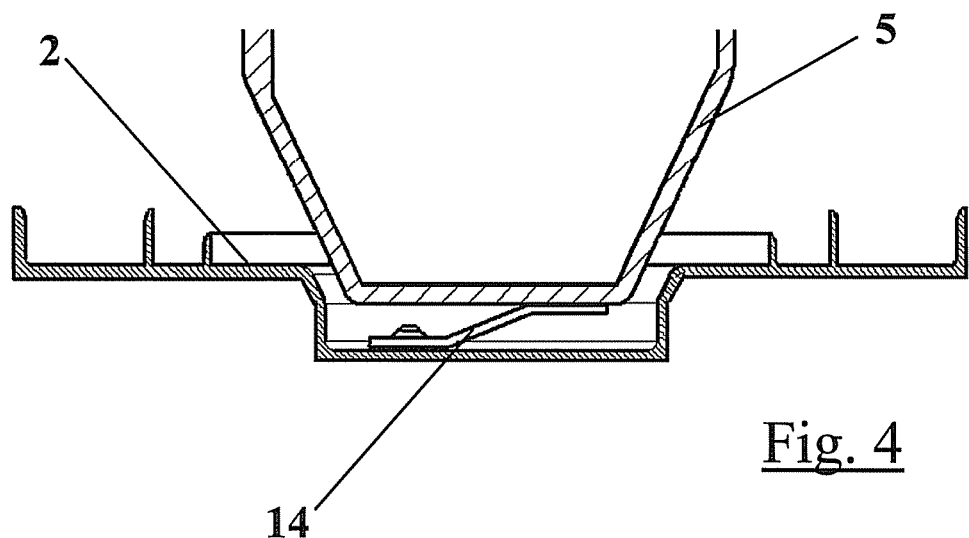
FIGS. 4 and 5 show variant embodiments of the dissipative flexible contact integral with the lower flange.

FIG. 4 is a cross section view showing another variant embodiment in which the dissipative flexible contact is presented in the form of a leaf spring fixed onto the lower flange 2 with which it is integral, for example by bonding, welding, riveting, over moulding or clipping. In this embodiment, the leaf spring is oriented toward the inside of the tubular holder 1 (not visible on this figure) and is pushed down by the shell 5 during the installation of the filter element in the filter.

Figure 5:
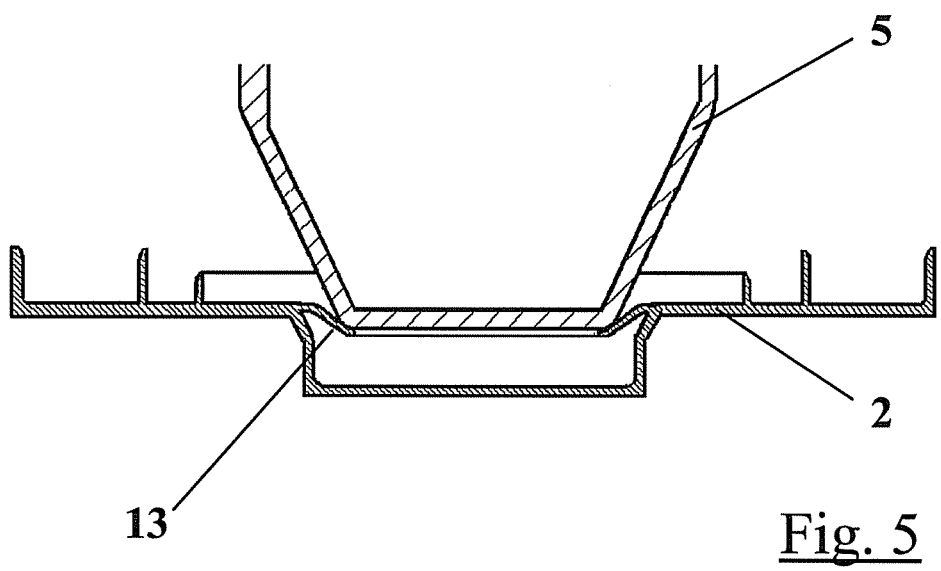

FIG. 5 is a cross section view showing another variant embodiment, in which the dissipative flexible contact is presented in the form of a skirt 13, having a substantially tapered shape, formed of a single piece with the lower flange 2 and flexible so that it deforms when it comes into contact with the shell 5.

Figure 6:
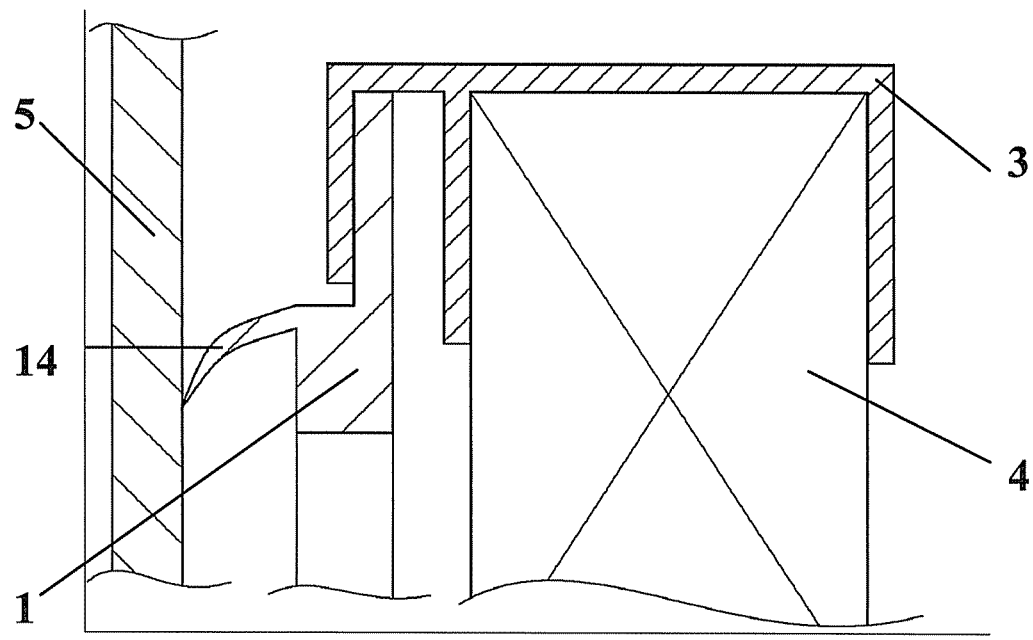
FIG. 6 shows another variant embodiment where the dissipative flexible contact is integral with the tubular holder.

FIG. 6 is a cross section view showing another embodiment of the invention in which the dissipative flexible contact 14 is integral with the tubular holder 1.

The dissipative flexible contact 14 is oriented towards the inside of the tubular holder 1 and is presented in the form of a lug forming a single and sole piece with the tubular holder 1. In this embodiment, the tubular holder 1 is dissipative. As the holder 1 is not in direct contact with the filter medium 4, it is necessary to provide an electrical (or dissipative) continuity between the medium 4 and the holder 1. This is why at least one of the upper 3 or lower 2 flanges (not shown in this figure) is also produced in a dissipative material.

Advantageously, in the embodiments shown in FIGS. 1 to 6, the dissipative flexible contact is integral with the filter element 20, which makes it possible to renew this contact during the replacement of the filter element and to avoid ageing of the contact (wear, oxidation, fatigue, etc.) which could interfere with electrostatic dissipation.

Figure 7:
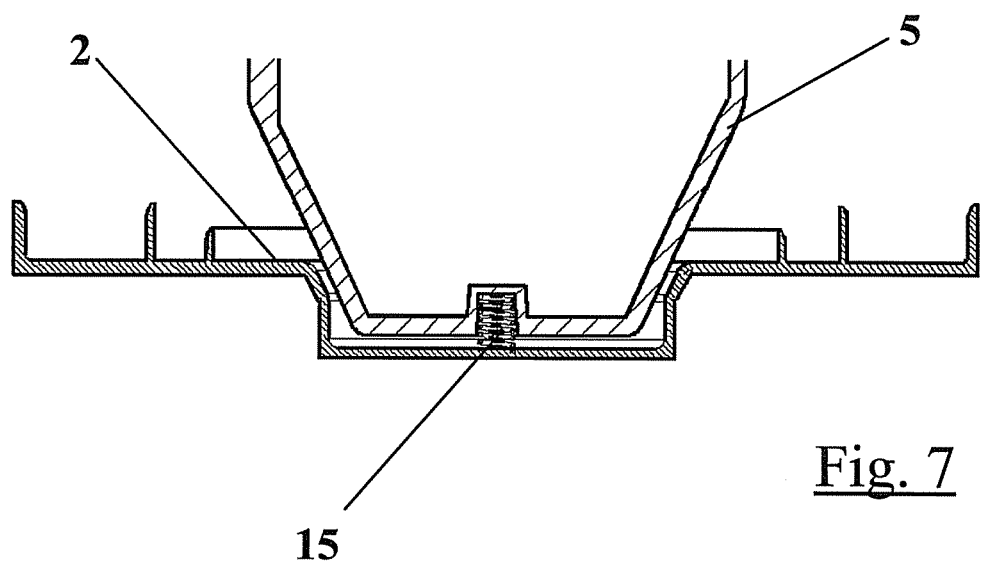

FIG. 7 is a cross section view showing a variant embodiment where the dissipative flexible contact is presented in the form of a helical spring 15 arranged between the shell 5 and the lower flange 2. The dissipative flexible contact 15 is mounted under the shell 5 and joined to the latter for example by bonding, welding, riveting, hot assembly or clipping.

The embodiments have been given for the purposes of illustration and do not limit the scope of the invention. In the embodiments described in relation to the illustrative figures, the electrical device is a fuel pump 6. The invention can also be implemented by using other electrical devices intended for a fuel filter, for example a fuel heater or a solenoid valve.

By way of a variant, the connector 7 can also be carried by the bowl 8 instead of the cover 9

The use of a spring 21 between the shell 5 and the pump body 6 is given by way of illustration. The dissipative contact between the shell 5 and the pump body 6 can also be made by simple contact, by a wire connection or an intermittent contact.

In another variant embodiment, the shell 5 is electrically connected directly to the connector 7.

The dissipative materials can also be replaced by conductive materials; in fact such materials also allow electrostatic charges to be dissipated.

Advantageously, the use of flexibly deformable materials for producing the dissipative flexible contact makes it possible to provide a permanent contact between the filter element 20 and the shell 5. The dissipative flexible contact deforms when the filter element 20 is inserted into the filter and remains pressing against the shell 5 continuously. The deformation of the dissipative flexible contact is sufficient to take up axial and/or radial play between the shell 5 and the filter element, without however subjecting it to any stress which would adversely affect the ease of installation or the operation of the filter.

The invention claimed is:

1. A fuel filter, comprising:
 a bowl;
 a dissipative shell;
 an electrical device arranged in said dissipative shell;
 a filter element that comprises at least one dissipative part;
 a cover, the bowl and the cover forming an enclosure in which the filter element and the electrical device are concentrically arranged;
 a connector making it possible to electrically connect the electrical device to an external supply, said connector carried by the bowl or by the cover;
 wherein:
 i) said shell is electrically connected to the earth of the electrical device or of the connector;
 ii) at least one dissipative flexible contact is arranged between said dissipative part and said shell in order to provide a dissipative continuity between the filter element and said shell.

2. The fuel filter according to claim 1, wherein the electrical device is a fuel pump and the filter element is arranged upstream of the fuel flow with respect to said pump.

3. The fuel filter according to claim 1, wherein at least one dissipative flexible contact is integral with the filter element.

4. A filter element for a fuel filter that comprises a dissipative shell in which an electrical device is arranged, said filter element comprising:
 a first flange having a central opening,
 a second flange,
 an interior space axially communicating with outside of the filter element through said central opening
 a substantially tubular-shaped holder that extends around said interior space, and
 a filter medium arranged around the holder and through which the fuel to be filtered can pass, the filter medium being interposed between the first flange and the second flange,
 wherein at least one part of the filter element is dissipative and comprises at least one dissipative flexible contact,
 and wherein said at least one dissipative flexible contact of the filter element extends in said interior space and is intended to provide a dissipative contact with said shell in the interior space.

5. The filter element according to claim 4, wherein said first flange is conductive and wherein at least one dissipative flexible contact is integral with said first flange and protrudes radially inwards.

6. The filter element according to claim 4, wherein said second flange is conductive and at least one dissipative flexible contact is integral with said second flange.

7. The filter element according to claim 4, wherein the tubular holder is conductive and at least one dissipative flexible contact is integral with the tubular holder.

8. The filter element according to claim 4, wherein at least one dissipative flexible contact is presented in the form of a lug or skirt formed from a single piece with the part with which it is integral.

9. The filter element according to claim 4, wherein at least one dissipative flexible contact is oriented towards the inside of the tubular holder.

10. The filter element according to claim 4, wherein at least one dissipative flexible contact is presented in the form of a coiled or leaf spring mounted on said dissipative part.

11. The filter element according to claim 4, wherein said first flange is an upper flange and said second flange is a lower flange.

12. The filter element according to claim 4, wherein said at least one dissipative flexible contact is arranged in an interior volume defined between the first flange and the second flange.

13. The filter element according to claim 8, wherein the first flange comprises spaced flexible lugs each in contact with the shell to form distinct dissipative flexible contacts of said at least one dissipative flexible contact.

14. A filter element for a fuel filter that comprises a dissipative shell in which an electrical device is arranged, said filter element comprising:
 a first flange,
 a second flange,
 a substantially tubular-shaped holder, extending around a longitudinal axis, and
 a filter medium arranged around the holder and through which the fuel to be filtered can pass, the filter medium being interposed between the first flange and the second flange,
 wherein the first flange is dissipative and comprises at least one laterally inwardly extending dissipative flexible contact arranged near an axial end of said tubular holder and each having a contacting end proximal with respect to said longitudinal axis and intended to provide a dissipative contact with said shell.

* * * * *